(12) United States Patent
Schottland

(10) Patent No.: US 7,718,238 B2
(45) Date of Patent: May 18, 2010

(54) PLASTICS ARTICLES SUCH AS BOTTLES WITH VISUAL EFFECT

(75) Inventor: Philippe Schottland, Evansville, IN (US)

(73) Assignee: Sabic Innovative Plastics IP B.V., Bergen Op Zoom (NL)

( * ) Notice: Subject to any disclaimer, the term of this patent is extended or adjusted under 35 U.S.C. 154(b) by 1098 days.

(21) Appl. No.: 10/063,792

(22) Filed: May 13, 2002

(65) Prior Publication Data

US 2003/0211288 A1 Nov. 13, 2003

(51) Int. Cl.
*B32B 1/02* (2006.01)
*B32B 1/08* (2006.01)

(52) U.S. Cl. .................... 428/34.1; 428/35.7; 428/35.9; 428/36.9; 428/412

(58) Field of Classification Search ................ 428/34.1, 428/35.7, 35.9, 36.9, 412
See application file for complete search history.

(56) References Cited

U.S. PATENT DOCUMENTS

| | | | | |
|---|---|---|---|---|
| 3,417,175 A | * | 12/1968 | Brown et al. | 264/220 |
| 3,573,472 A | * | 4/1971 | Madalo | 250/371 |
| 3,728,143 A | * | 4/1973 | Pollard | 106/452 |
| 3,873,390 A | * | 3/1975 | Cornell et al. | 428/446 |
| 3,972,849 A | | 8/1976 | Bruenemann et al. | |
| 4,005,111 A | | 1/1977 | Mach et al. | |
| 4,217,438 A | | 8/1980 | Brunelle et al. | |
| 4,379,934 A | | 4/1983 | Graser et al. | |
| 4,446,324 A | | 5/1984 | Graser | |
| 4,486,587 A | | 12/1984 | Seybold | |
| 4,618,694 A | | 10/1986 | Iden et al. | |
| 4,667,036 A | | 5/1987 | Iden et al. | |
| 5,066,580 A | * | 11/1991 | Lee | 435/7.21 |
| 5,086,937 A | * | 2/1992 | Robinson | 215/398 |
| 5,224,614 A | | 7/1993 | Bono et al. | |
| 5,470,502 A | | 11/1995 | Hahn et al. | |
| 5,605,761 A | | 2/1997 | Burns et al. | |
| 5,660,497 A | * | 8/1997 | Kozak et al. | 404/14 |
| 5,672,643 A | | 9/1997 | Burns et al. | |
| 5,674,622 A | | 10/1997 | Burns et al. | |
| 5,710,197 A | | 1/1998 | Fischer et al. | |
| 5,754,337 A | | 5/1998 | Burns et al. | |
| 5,920,429 A | | 7/1999 | Burns et al. | |
| 6,219,329 B1 | | 4/2001 | Tanaka et al. | |

FOREIGN PATENT DOCUMENTS

| | | |
|---|---|---|
| EP | 0 073 007 A | 3/1983 |
| EP | 0409483 A2 | 1/1991 |
| EP | 0 422 474 A | 4/1991 |
| EP | 0 692 517 A | 1/1996 |

(Continued)

*Primary Examiner*—Marc A Patterson
(74) *Attorney, Agent, or Firm*—Larson & Anderson, LLC

(57) ABSTRACT

Plastic articles, and in particular polycarbonate articles, provide an appealing aesthetic look in the form of a colored glow at locations defined by cuts and/or protrusions in the surface of the article as a result of incorporation of a photoluminescent material in the polycarbonate from which the article is formed. The cuts and/or protrusions define a graphic image, for example one or more letters (i.e., an initial or name), an abstract design, a drawing or a trademark or logo. Ambient light entering the plastic body results in luminescence from the photoluminescent material which is conducted as a result of internal reflectance within the plastic body to the edges of the cuts in the bodies surface.

39 Claims, 6 Drawing Sheets

FOREIGN PATENT DOCUMENTS

| | | | |
|---|---|---|---|
| EP | 1059237 A1 * | 12/2000 | |
| JP | 2001-106888 | 4/2001 | |
| WO | WO 96/17012 A1 | 6/1996 | |
| WO | WO 01/26984 A1 | 4/2001 | |
| WO | WO 01/62867 A | 8/2001 | |
| WO | WO 01/94496 A1 | 12/2001 | |

* cited by examiner

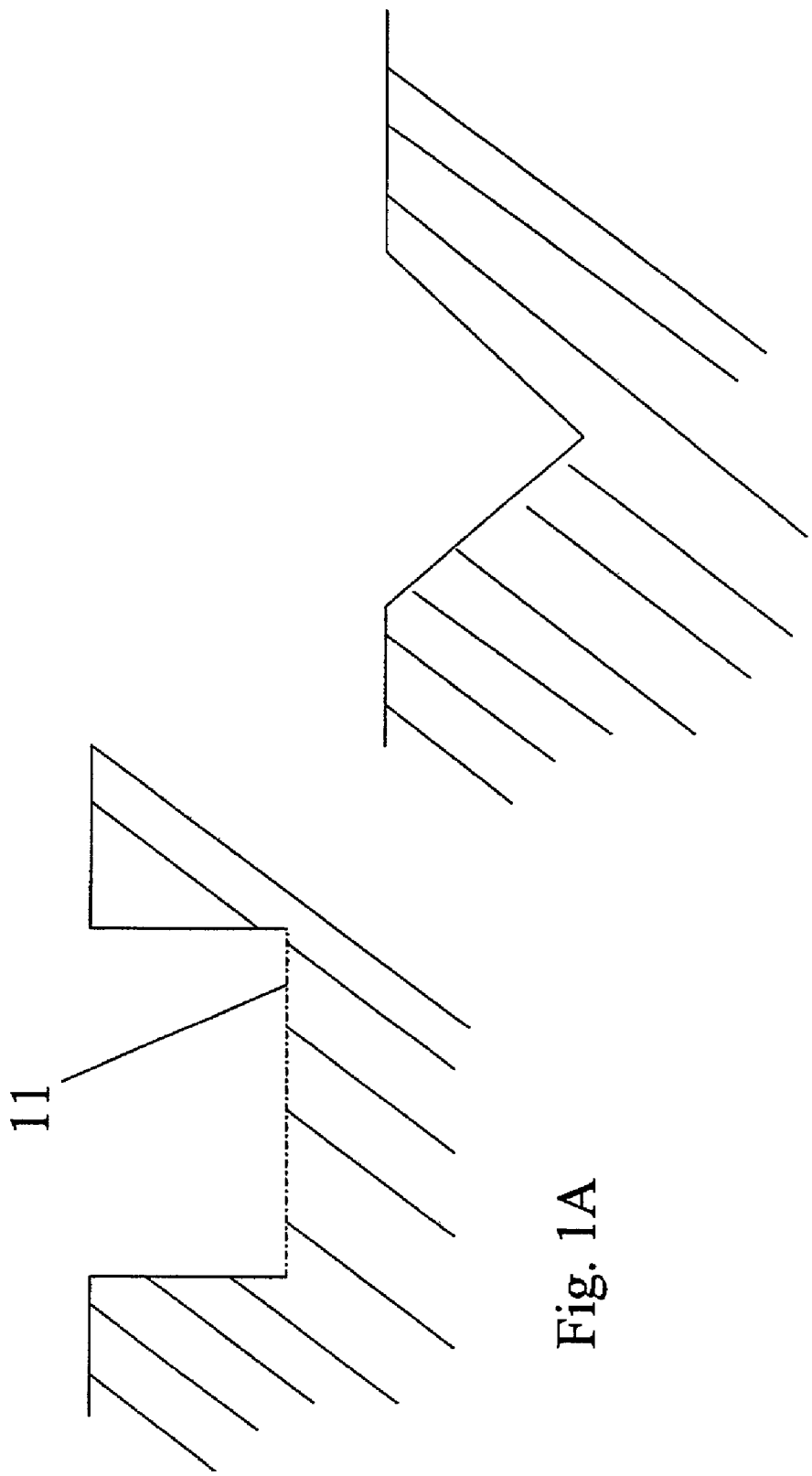

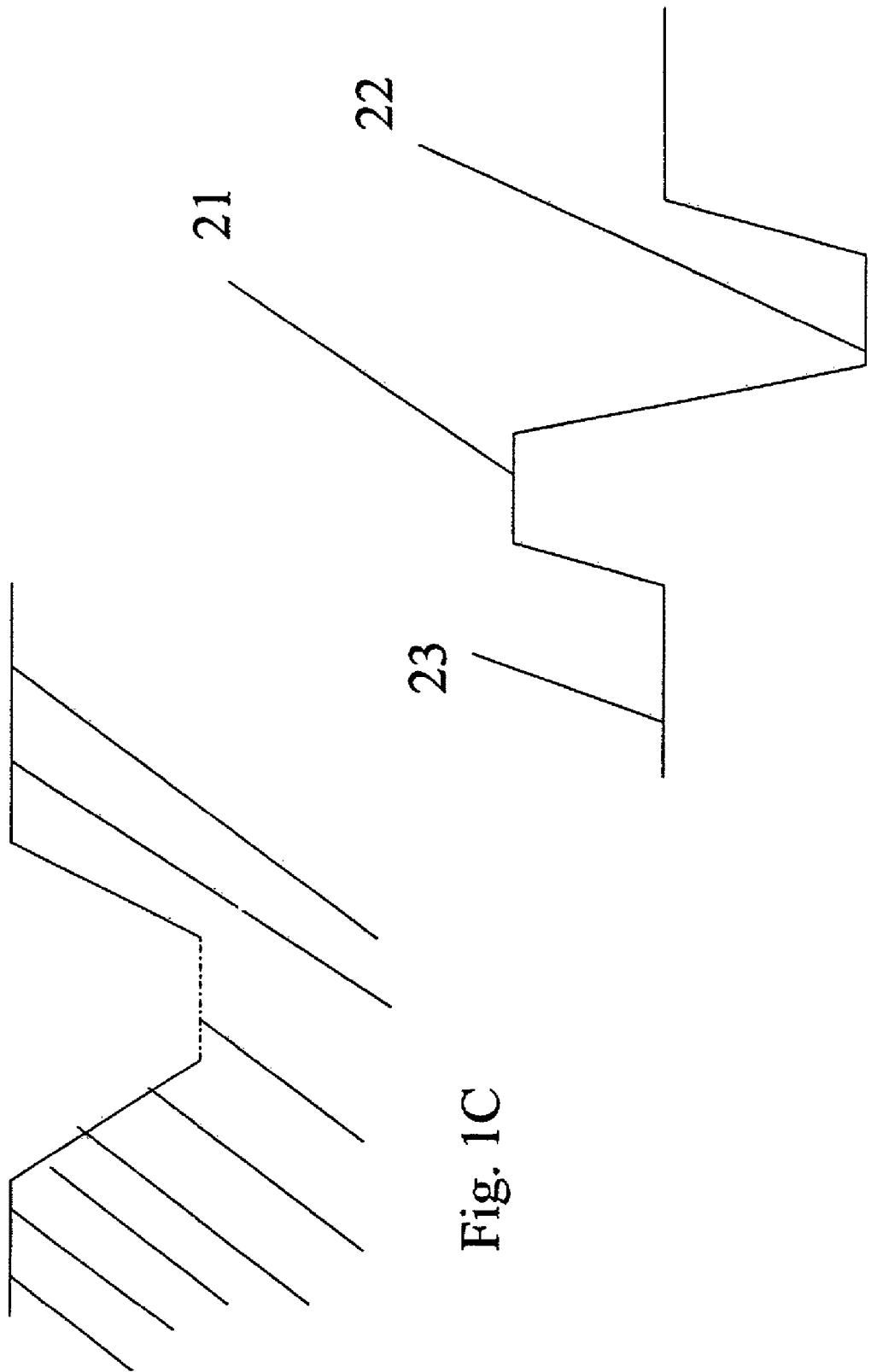

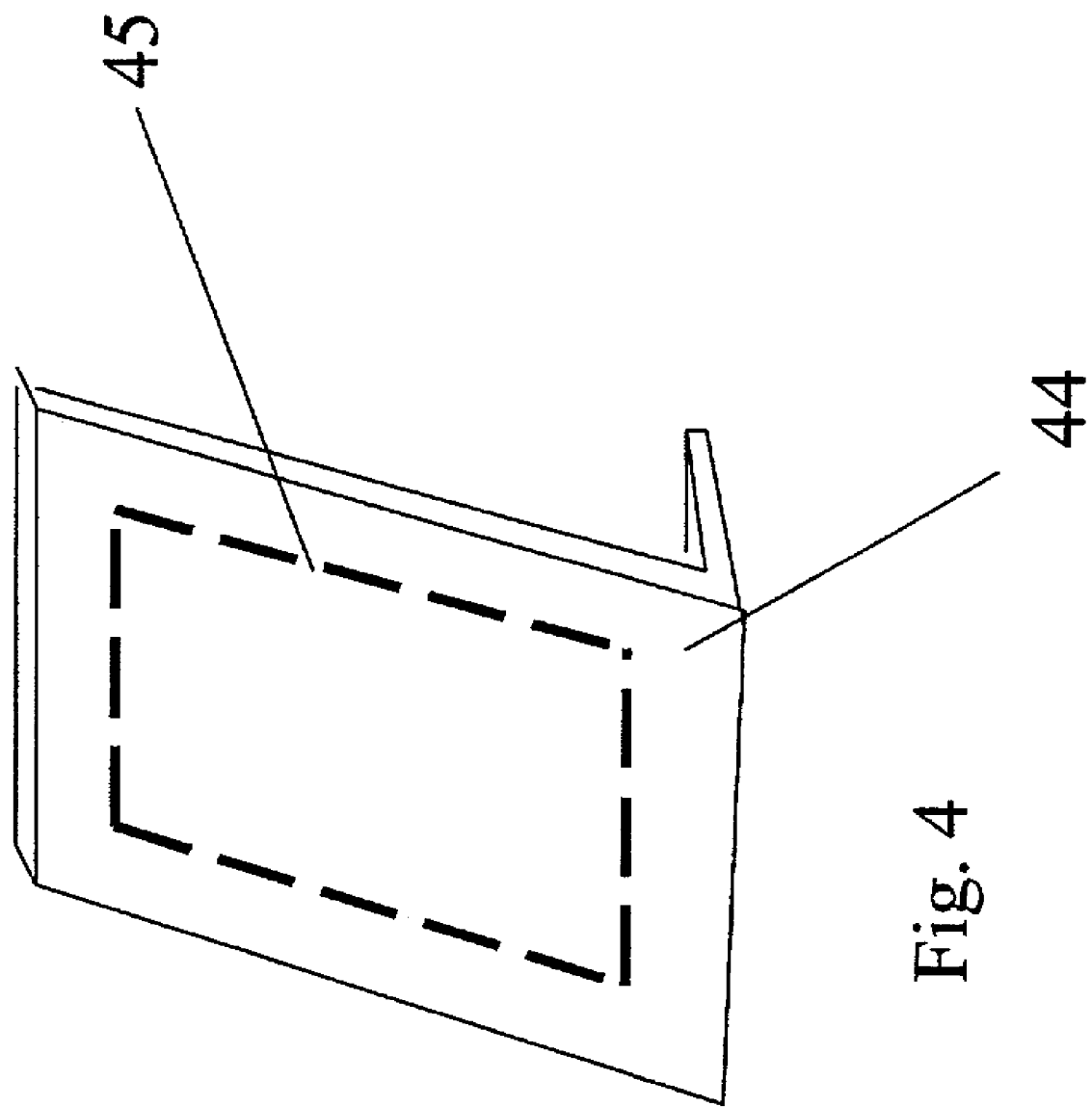

PLASTICS ARTICLES SUCH AS BOTTLES WITH VISUAL EFFECT

BACKGROUND OF INVENTION

This application relates to plastic articles such as bottles which provide a visual effect in the form of an aesthetic colored glow at locations defined by cuts or protrusions in the surface of the article.

Plastics, including polycarbonate, are commonly employed in the manufacture of bottles, particularly reusable water bottles, and other articles. These articles may be substantially colorless or they may be prepared in decorative colors.

SUMMARY OF INVENTION

The present invention provides plastic articles, and in particular polycarbonate articles, that provide an appealing aesthetic look in the form of a colored glow at locations defined by cuts and/or protrusions in the surface of the article as a result of incorporation of a photoluminescent material in the polycarbonate from which the article is formed. The cuts or protrusions define a graphic image, for example one or more letters or numbers (i.e., an initial or name), an abstract design, a drawing or a trademark or logo. Ambient light entering the plastic body results in luminescence from the photoluminescent material which is conducted as a result of internal reflectance within the plastic body to the edges of the cuts in the bodies surface.

BRIEF DESCRIPTION OF DRAWINGS

FIGS. 1A-C show the shape of cuts that can be used to produce graphic images on an article in accordance with the invention;

FIG. 2 shows a combination of cuts and protrusions that can be used to produce graphic images on an article in accordance with the invention;

FIG. 4 shows an article in accordance with the invention with a flat surface.

DETAILED DESCRIPTION

Figure 3A:
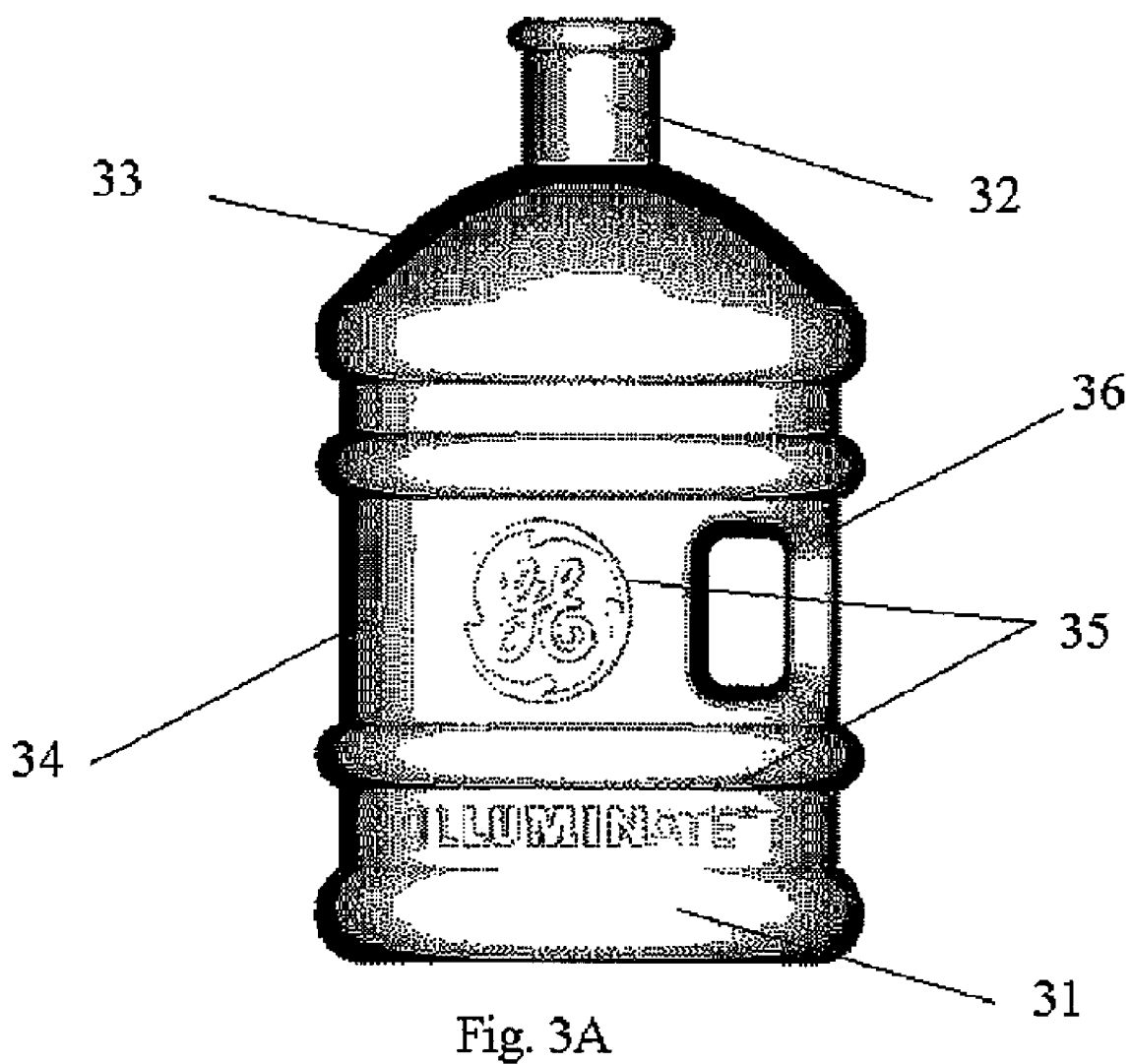
FIGS. 3A and B shows articles in accordance with the invention with annular bodies.

This application relates to plastic articles that are formed from a combination of a transparent plastic a photoluminescent material. These articles provide an aesthetic visual effect in the form of a colored glow at cuts or protrusions formed in the surface of the article.

In general, the articles of the invention may be any utilitarian article which may be formed from molded plastic and in which it would be desirable to have a luminescent image provided. The exception is lenses and lamp bezels for use in combination with a specific light source, for example in automotive headlamps. Because lenses and bezels are intended to be used with specific light sources (for example High intensity discharge automotive headlamps) rather than ambient light, they are the subject of a separate application (U.S. Provisional Application Ser. No. 60/370,790, filed Apr. 5, 2002 and a U.S. utility application Ser. No. 10/063,791, filed concurrently herewith, both of which are incorporated herein by reference).

As used in the specification and claims of this application, the term "graphic image" refers to any image which may be desired on the article, or example one or more letters or numbers (i.e., an initial or name), an abstract design, a drawing, or a trademark or logo. The luminescent graphic image formed by the cuts and/or protrusions may complement a non-luminescent image that is incorporated into the article. Thus, for example, the luminescent image on a cover sheet for a photograph might provide a halo or a mustache to be viewed in combination with a photograph placed under the cover.

The articles of the present invention may be formed from any transparent or translucent thermoplastic material that has an index of refraction sufficiently different from air to produce a degree of internal reflectance such that an amount of light sufficient to produce a luminescent visual effect is conducted within the plastic material to a cut in or protrusion from the surface. Generally at least 10% of the light emitted by photoluminescence is conducted through the interior of the article to the edges of the cut or protrusion, preferably at least 30%. To achieve this level of internal reflectance, it is desirable that the thermoplastics employed have an index of refraction of at least 1.4 at room temperature. It is also desirable that the thermoplastics have good light transmission and a low haze. Good light transmission is defined here as a minimum of 60% and good haze as a haze value of less than 10% as measured per ASTM D1003 at 3 mm thickness. Amorphous thermoplastic materials are therefore preferred but some semi-crystalline materials with less than 30% crystallinity ratio may be employed. Thermoplastics which have this characteristic include, without limitation, polycarbonate (PC), polyethylene terephtalate (PET), polymethyl methacrylate (PMMA), polystyrene (PS), polyvinyl chloride (PVC), clarified polyolefins, poyetherimide (PEI), polyphenylene ether (PPE), amorphous aromatic polyamides like PA 6-3T, and polysulfones. Preferred plastics are polycarbonates, which combine high indices of refraction of around 1.58, light transmission of about 87% and haze of about 1% at 3 mm thickness. Polycarbonate can be easily blow molded to form bottles or similar containers with great impact resistance which are therefore reusable. It is also FDA approved which is an absolute requirement for all containers used in food packaging or food service. Due to its elevated glass transition temperature, it can be fully sterilized at high temperature without irreversibly loosing its mechanical properties conversely to other thermoplastics like PVC or PET.

When cuts are used to form the graphic image, the cut should have sufficient depth to produce a substantial surface for escape of emitted light, but should not be so deep as to impair the structural integrity of the article. Thus, the permitted depth will depend of the thickness of the article, the purpose for which it is to be used, and the nature of the plastic. For many purposes and materials, however, cuts on the order of 0.5 to 3 mm in depth are appropriate. The cuts may be made in various shapes. For example, as depicted in FIG. 1A, the cut may have a rectangular bottom. In this embodiment, it may be desirable to provide texturing as represented by the dashed line 11 at the bottom of the cut to permit emission from this surface and increase the magnitude of the visual effect. Non-textured sides for the cut are preferred in order to create a homogenous light emission in this part of the cut. FIG. 1B shows a cut with a V-shaped bottom. FIG. 1C shows a cut with a trapezoidal shape. Again, the bottom of the cut may be textured, if desired, to increase the intensity of the visual effect. The bottom of the cut can also be rounded in order to facilitate tool (i.e. mold) manufacture, allow easier filling of the tool by the molten thermoplastic during blow-molding operation, and reduce local stress in the article.

When protrusions are used to form the graphic image, the protrusions may be rectangular, V-shaped, trapezoidal, and may have rounded edges if desired. Similar to the cuts, any top surface of the protrusion may be textured to increase the light intensity escaping from the surface, and thus the visual effect. The protrusion should have a height above the main surface of the article sufficient to allow escape of light in observable amounts through the sides surfaces of the protrusion. In general, it will be desirable to have protrusions of at least 0.5 mm, for example 1 to 5 mm, consistent with the size and purpose of the article.

Articles in accordance with the invention may have a combination of protrusions and cuts. Thus, as shown in FIG. 2, a trapezoidal protrusion 21, which is elevated relative to the main article surface 23, is positioned adjacent to a trapezoidal cut 22, which is inset below main article surface 23. The protrusion 21 and the cut 22 are shown as contiguous features, but there could also be an intervening portion of the main article surface. By combining cuts and protrusions of different shapes and surface areas, visual effects which combine regions of different intensities can be achieved.

The articles of the invention are suitably formed by molding processes conventionally employed in the formation of plastic articles. For example, the articles may be formed by blow-molding, injection molding, thermoforming, or sheet/film extrusion. In some instances, the cuts can be achieved after molding of the article using a hot stamping process or a laser beam.

In one embodiment of the present invention, the articles comprise an annular body, for example a right cylinder (circular, elliptical or other closed rounded shape), having a contiguous bottom and a contiguous top. In the case of a water bottle of the type shown in FIG. 3A, the bottom 31 is substantially flat, while the top has a neck 32 for receiving a cap and shoulders 33 extending outwards to join with the sides of the annular body 34. Many larger water bottles, such as 5 gallon water bottles used in water coolers do not have a threaded neck because they would have compatibility problems with some water coolers. The cap is usually snapped on and there is a removable seal that protects the water in the bottle from contamination. Other bottle types, such as water bottles used for hiking or biking, or beverage bottles, may have threaded necks. Other shapes for the bottom and top, and well as non-circular and angled cylinders, may also be used. In accordance with the invention, cuts or protrusions are formed in the surface of the annular body, the bottom, the top, or some combination thereof to form a graphic image 35. If desired, an integral handle 36 may be formed in the molding process.

Figure 3B:
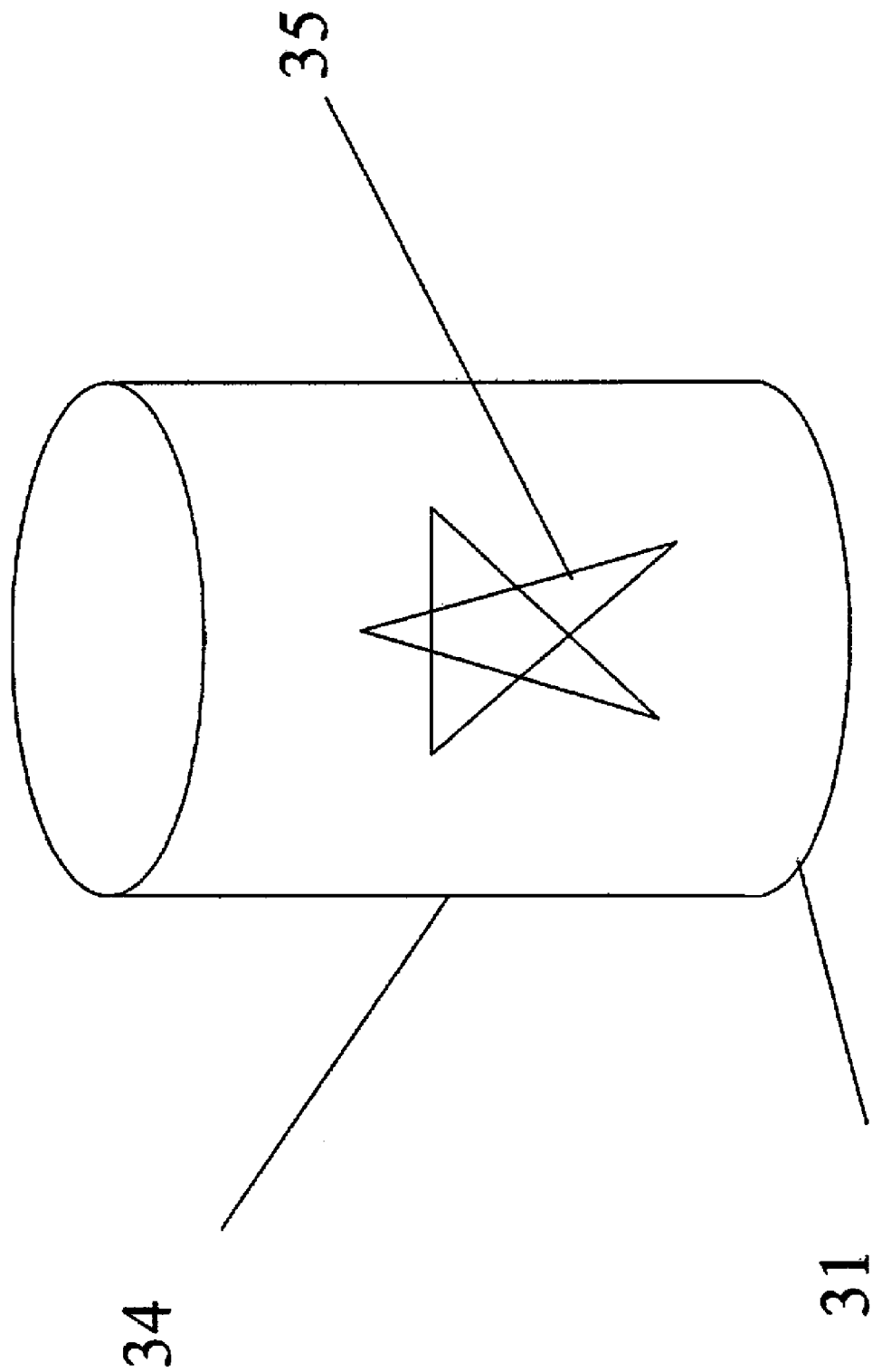

In another embodiment of the invention, as depicted in FIG. 3B, the article comprises an annular body member 34 with a bottom 31 but no top. Depending on size, such an article could be used as a storage receptacle, laundry hamper or a vase.

In a further embodiment of the invention, the article comprises a flat or flattened disc or rectangular body. Articles with this configuration include but are not limited to key fobs; one or more sides of a box, for example jewelry boxes or lunch boxes; panes for covering pictures; flat panels which can be used in chandeliers or wind chimes, office and desk accessories, including clip boards, CD cases, rulers, and trays; and window ornaments. For example, FIG. 4 shows a picture holder formed from molded plastic which has a border 45 cut into the flat surface 44.

Figure 5:
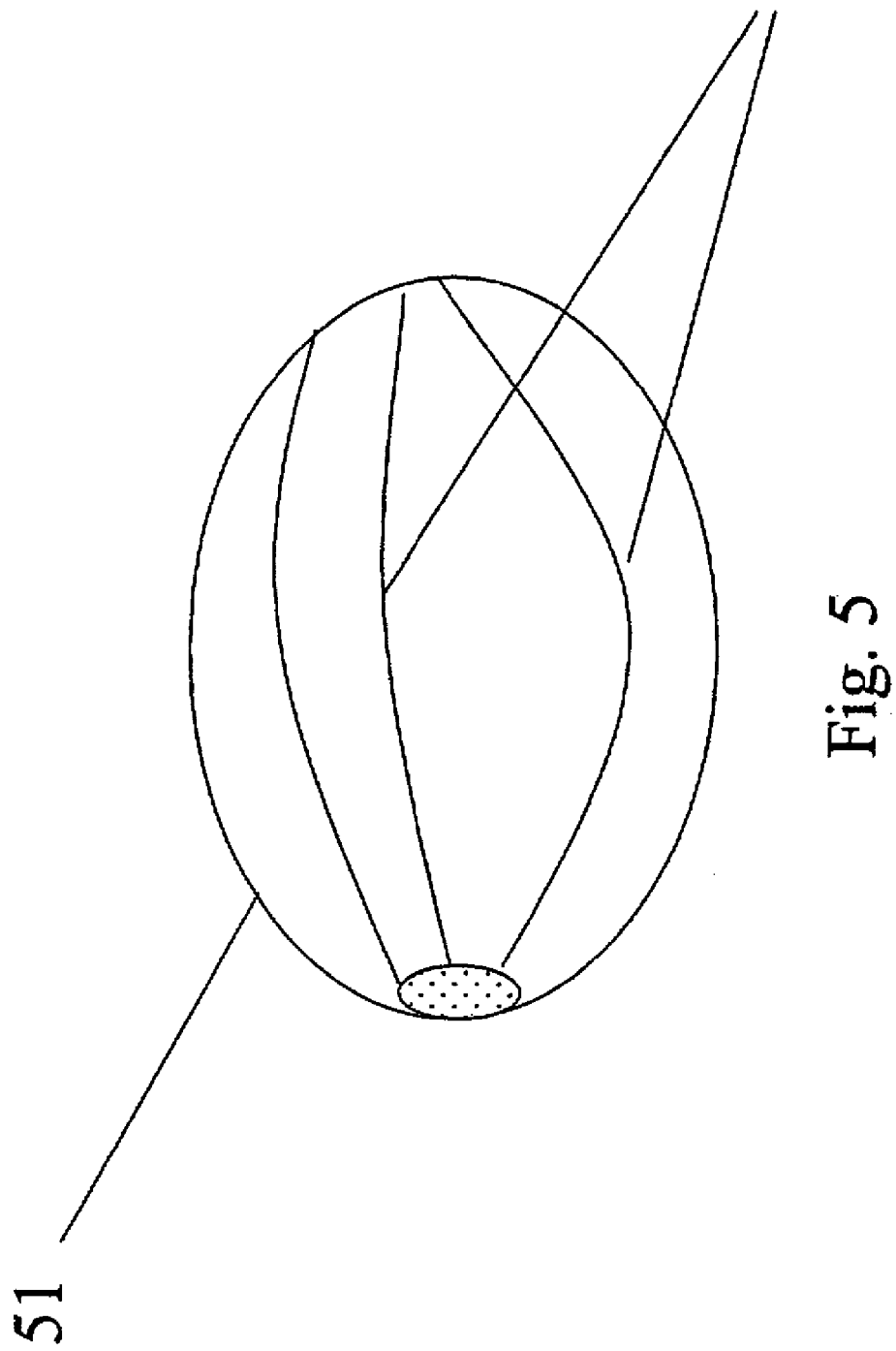
FIG. 5 shows an article in accordance with the invention with an irregular surface.

In a further embodiment of the invention the molded plastic component has an irregular three-dimensional shape with cuts formed in the surface thereof to produce a pattern of luminescence that complements the three dimensional shape. Such articles include but are not limited to jewelry, beads, buttons, toys (for example pin wheels or molded characters), picture frames, eye glasses (lens or frames), pen barrels, telephones or telephone covers. FIG. 5 shows a bead in accordance with the invention. Cuts 55 are formed in the surface of the bead 51, defining lines along which the visual effect will occur.

The articles of the present invention comprise a molded body having a major outer surface and edge surfaces formed by the introduction of cuts or protrusions defining a graphic image. The articles are formed from a high-refractive index plastic, such as polycarbonate, and a photoluminescent material. Light which includes light of a wavelength within the excitation spectrum of the photoluminescent dye is partially absorbed and partially transmitted. The absorbed light is at least partially (depending on the quantum yield of the luminescence) emitted as light of a higher wavelength (as a result of a Stokes shift) and is conducted to a substantial extent to the edge surfaces of the article (those formed by cuts, and those which are inherent in the shape of the article) thereby creating a colored visual effect at the edges. As used in the specification and claims of this application, the term "substantial extent" means in an amount effective to create an observable visual effect.

As used in the specification and claims of this application, the term "photoluminescent material" refers to any substance that exhibits photoluminescence in response to excitation energy provided by ambient light (sunlight, room light and other artificial light sources), including without limitation organic compounds that solubilize in the plastic polymer matrix during the compounding operation, organic nanoparticle dyes (also known as "nano-colorants") and inorganic photoluminescent materials, including nanoparticles. Photoluminescence occurs when a substance absorbs radiation of a certain wavelength and re-emits photons, generally of a different and longer wavelength. When a photoluminescent molecule absorbs light, electrons are excited to a higher "excited" energy state. The molecule then loses part of its excess of energy by collisions and internal energy conversions and falls to the lowest vibrational level of the excited state. From this level, the molecule can return to any of the vibrational levels of the ground state, emitting its energy in the form of photoluminescence. Photoluminescence is a generic term which encompasses both fluorescence and phosphorescence. In the present invention, the photoluminescent materials are preferably organic fluorescent dyes because of the higher quantum yield associated with fluorescence as opposed to other types of photoluminescent processes. Preferably, the organic fluorescent dye is selected to have a quantum yield of fluorescence of at least 0.7, more preferably at least 0.8 and most preferably at least 0.9 Typically, the emission by fluorescence is an extremely brief phenomenon lasting generally between $10^{-4}$ and $10^{-9}$ seconds.

Specific non-limiting examples of fluorescent dyes that may be used in the articles of the invention are perylene derivatives, anthracene derivatives, indigoid and thioindigoid derivatives, imidazole derivatives, naphtalimide derivatives, xanthenes, thioxanthenes, coumarins, rhodamines, or (2,5-bis[5-tert-butyl-2-benzoxazolyl]thiophene) and all their derivatives. Non-fluorescent dyes may be selected from but are not limited to the following families: azo dyes, methine dyes, pyrazolones, quinophtalones, perinones, anthraquinones, phtalocyanines and all their derivatives. In general, very low loadings of dyes, for example less than 1.0% are used to create the effect described in this invention. In certain cases, it may be desired to have a final object with the effect of this invention but with almost no visible color (for example a "clear" water bottle). In these cases, the fluorescent dye loading can be extremely low, sometimes as low as 0.0001%. Except for the blue/violet colors and maybe some greens, the fluorescent dye loading to retain the "clear" appearance is usually lower than 0.0005% by weight, for example from 0.0001% to 0.0003% by weight, which is enough to generate a very noticeable visual effect at the edges of the article. In the blue/violet colors, the fluorescent dye loading is significantly higher due to the fact that most of its absorption is located in the UV range. Typically, the fluorescent dye loading in this case is between 0.005% to 0.5% by weight, with 0.01% to 0.2% being preferred and 0.03% to 0.1% being most preferred.

Nano-colorants can be obtained by various methods and usually combine the advantages of both dyes and pigments. Their light fastness compared to the corresponding dye molecule is usually greatly improved. Since their particle size is in general less than 100 nanometers, preferably less than 50 nm, and more preferably less than 10 nm, they do not scatter light conversely to most pigments used to color plastics. Nano-colorants can be obtained by various methods. For example, dye molecules can be converted to nano-colorants by adsorption on a nano-clay particle (with or without creating a chemical bond between the nano-clay and the dye) or by nano-encapsulation in a polymer matrix (usually acrylic polymer). Note that the encapsulation method usually involves emulsion polymerization in order to form spherical nano-particles of polymer in which the dye is dispersed. Nano-colorants can be fluorescent if the dye molecule (or the inorganic compound) used to prepare the nano-colorant is fluorescent. Specific non-limiting examples of fluorescent dyes that may be employed to form nano-colorants used in the articles of the invention are perylene derivatives, anthracene derivatives, indigoid and thioindigoid derivatives, imidazole derivatives, naphtalimide derivatives, xanthenes, thioxanthenes, coumarins, rhodamines, or (2,5-bis[5-tert-butyl-2-benzoxazolyl]-thiophene) and all their derivatives.

Inorganic nano-particles may also be used as nano-colorants although their extinction coefficient is usually fairly low. Examples of fluorescent inorganic nano-particles include, but are not limited to, lanthanide complexes and chelates (for instance Europium chelates). Note that some of these inorganic nano-colorant may exhibit a larger Stokes shift than organic fluorescent colorant, i.e. emit light at a much longer wavelength than the excitation wavelength.

When the article is formed from polycarbonate, the polycarbonate component suitably includes compositions having structural units of the formula (I) and a degree of polymerization of at least 4:

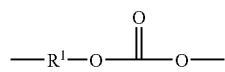

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

-$A^1$-$Y^1$-$A^2$- (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

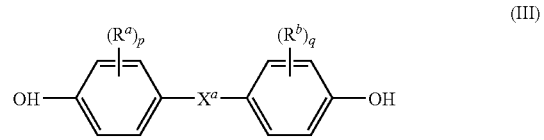

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

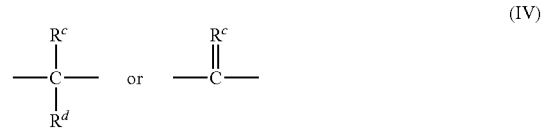

(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-t-butylphenyl)propane; bis(hydroxyaryl)alkanes such as 2,2-bis(4-hydroxy-3-bromophenyl)propane; 1,1-bis(4-hydroxyphenyl)cyclopentane; 4,4''-biphenol; and bis(hydroxyaryl)cycloalkanes such as 1,1-bis(4-hydroxyphenyl)cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid.

The polycarbonate component may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; and blowing agents. Combinations of any of the foregoing additives may be used. Such additives may be mixed at a suitable time during the mixing of the components for forming the composition.

When the article is formed by injection molding of a polycarbonate resin composition, the polycarbonate formulation is suitably compounded in an extruder in order to provide appropriate mixing of the composition. Although the use of a single-screw extruder is conceivable, a twin-screw extruder is usually preferred to optimize the mixing and reduce the likelihood of creating scattering particles in the final product or simply avoid potential streaking issues that may stem from undissolved high-melting point colorants such as some perylene derivatives (melting point around 300° C.). Although the polycarbonate composition is generally light stabilized and may be coated with a UV absorptive coating, it is important to use dyes that combine improved light fastness. Good examples of fluorescent dyes with an improved light fastness are the perylene derivatives like the Lumogen Orange F-240, Lumogen Red F-300 and Lumogen Yellow F-083 supplied by BASF. It is also possible to further improve light stability by using nano-colorants. When the desired visual effect is of a blue or violet color and the application requires outdoor light stability for an extended period of time, the use of blue/violet fluorescent nano-colorants should be considered.

In order to better control the extremely low amount of dyes introduced in the formulation and therefore have a better color control of the article, the use of volumetric or gravimetric feeders is highly recommended. The feeders can either feed a letdown of the concentrate in polycarbonate resin powder (preferably milled powder) or feed an already compounded (extruded) color masterbatch in a pellet form. The colorant loading in the letdown or the concentration of the masterbatches depends on the feeder capability, and especially the feeding rate. In general, powder letdown vary between 10:1 and 10,000:1 ratios of colorant (i.e. dye) to powder. Dye mixtures can also be used in a letdown form and fed from a single feeder although it is not the most preferred method. Poor color control may potentially result in articles that would not be suitable for an article application, i.e. beam color or light output not being compliant with a defined standard.

Articles like water bottles are generally made using a blow-molding process from a colorless or colored thermoplastic resin. The main requirement for the resin is its melt strength. For instance, when a blow-molding grade polycarbonate is used, the melt flow index of the resin is typically between 1.5 and 3 grams per 10 minutes as measured per ASTM 1238 (conditions: 300° C./1.2 kg/1" orifice). Combination of melt strength and mechanical properties like flexural modulus, tensile strength and impact resistance makes polycarbonate the material of choice in blow-molding applications especially when objects exhibiting the edge glow visual effect are needed. Materials with poor melt strength will yield articles with poor mechanical resistance. As a comparison, intricate shapes like water bottles with handles or objects with deep cuts or sharp protrusions can be blow molded using polycarbonate and still retain their physical properties. Typically, blow-molding grades of polycarbonates contain at least 50% of branched polycarbonate resin in order to achieve the optimum melt flow strength. Branched polycarbonate has an average molecular weight (Mw) usually comprised between 36,000 and 40,000 with a preferred value of about 38,000 as measured by gel permeation chromatography. With blow-molding polycarbonate grades, it is possible to obtain articles like water bottles with thin walls (for example 1 mm) and an outstanding impact resistance. When submitted to a drop test from a height of 15 feet, a 5-gallon polycarbonate bottle filled with water is totally unharmed whereas PVC-based or PET-based bottles explode or crack.

When the graphic image is defined by protrusions these are formed in the course of the molding process. When cuts are employed, they may be formed during the molding process or in a separate cut-forming step after molding is complete. The latter choice is more suited to customization of articles in smaller batches.

Polycarbonate formulations (A) to (G) described below in example 1 have been defined to illustrate the ability to create a broad palette of visual effect color for articles in accordance with the invention. A twin-screw extruder has been used for the compounding step with standard Lexan® LS-2 polycarbonate extrusion conditions. Color chips (5.08 cm×7.62 cm×3.2 mm) were molded for each formulation and color coordinates were measured on the chips in transmission mode using a MacBeth 7000A spectrophotometer selecting illuminant C and a 2 degree observer.

Polycarbonate formulations (H), (I) and (J) described below in example 2 have been defined to illustrate the ability to create material suitable for blow molding of a water bottle similar to the one presented in FIG. 3A and exhibiting the visual effect presented in this invention.

EXAMPLES

The invention will now be further described with reference to the following, non-limiting examples.

Example 1

A polycarbonate resin composition (A) was prepared by mixing:
- 65 parts of poly(bisphenol-A carbonate) with an average molecular weight ($M_W$) of 29,900
- 35 parts of poly(bisphenol-A carbonate) with an average molecular weight ($M_W$) of 21,900
- 0.06 parts of tris(2,4-di-tert-butylphenyl)phosphite
- 0.27 parts of pentaerythritol tetrastearate
- 0.27 parts of 2-(2H-benzotriazol-2-yl)-4-(1,1,3,3-tetramethylbutyl)phenol
- 0.00015 parts of a yellow perylene derivative (BASF Lumogen Yellow F-083)
- 0.0001 parts of a red perylene derivative (BASF Lumogen Red F-300).

A polycarbonate resin composition (B) was prepared by mixing:
- 65 parts of poly(bisphenol-A carbonate) with an average molecular weight ($M_W$) of 29,900
- 35 parts of poly(bisphenol-A carbonate) with an average molecular weight ($M_W$) of 21,900
- 0.06 parts of tris(2,4-di-tert-butylphenyl)phosphite
- 0.27 parts of pentaerythritol tetrastearate
- 0.27 parts of 2-(2H-benzotriazol-2-yl)-4-(1,1,3,3-tetramethylbutyl)phenol
- 0.00015 parts of a yellow perylene derivative (BASF Lumogen Yellow F-083)
- 0.000075 parts of C.I. Pigment Blue 60 (BASF Heliogen Blue K6330).

A polycarbonate resin composition (C) was prepared by mixing:
- 65 parts of poly(bisphenol-A carbonate) with an average molecular weight ($M_W$) of 29,900
- 35 parts of poly(bisphenol-A carbonate) with an average molecular weight ($M_W$) of 21,900
- 0.06 parts of tris(2,4-di-tert-butylphenyl)phosphite
- 0.27 parts of pentaerythritol tetrastearate
- 0.27 parts of 2-(2H-benzotriazol-2-yl)-4-(1,1,3,3-tetramethylbutyl)phenol
- 0.01 parts of a naphtalimide derivative (BASF Lumogen Violet F-570)-0.0001 parts of C.I. Pigment Blue 60 (BASF Heliogen Blue K6330)
- 0.00005 parts of C.I. Solvent Violet 36 (Bayer Macrolex Violet 3R).

A polycarbonate resin composition (D) was prepared by mixing:
- 65 parts of poly(bisphenol-A carbonate) with an average molecular weight ($M_W$) of 29,900
- 35 parts of poly(bisphenol-A carbonate) with an average molecular weight ($M_W$) of 21,900
- 0.06 parts of tris(2,4-di-tert-butylphenyl)phosphite
- 0.27 parts of pentaerythritol tetrastearate
- 0.27 parts of 2-(2H-benzotriazol-2-yl)-4-(1,1,3,3-tetramethylbutyl)phenol
- 0.05 parts of 2,5-bis(5'-tert-butyl-2-benzoxazolyl)thiophene (Ciba Uvitex OB)
- 0.0001 parts of C.I. Pigment Blue 60 (BASF Heliogen Blue K6330)
- 0.00005 parts of C.I. Solvent Violet 36 (Bayer Macrolex Violet 3R).

A polycarbonate resin composition (E) was prepared by mixing:
- 65 parts of poly(bisphenol-A carbonate) with an average molecular weight ($M_W$) of 29,900
- 35 parts of poly(bisphenol-A carbonate) with an average molecular weight ($M_W$) of 21,900
- 0.06 parts of tris(2,4-di-tert-butylphenyl)phosphite
- 0.27 parts of pentaerythritol tetrastearate
- 0.27 parts of 2-(2H-benzotriazol-2-yl)-4-(1,1,3,3-tetramethylbutyl)phenol
- 0.00014 parts of a red perylene derivative (BASF Lumogen Yellow F-300).

A polycarbonate resin composition (F) was prepared by mixing:
- 65 parts of poly(bisphenol-A carbonate) with an average molecular weight ($M_W$) of 29,900
- 35 parts of poly(bisphenol-A carbonate) with an average molecular weight ($M_W$) of 21,900
- 0.06 parts of tris(2,4-di-tert-butylphenyl)phosphite
- 0.27 parts of pentaerythritol tetrastearate
- 0.27 parts of 2-(2H-benzotriazol-2-yl)-4-(1,1,3,3-tetramethylbutyl)phenol
- 0.0002 parts of an orange perylene derivative (BASF Lumogen Orange F-240).

A polycarbonate resin composition (G) was prepared by mixing:
- 65 parts of poly(bisphenol-A carbonate) with an average molecular weight ($M_W$) of 29,900
- 35 parts of poly(bisphenol-A carbonate) with an average molecular weight ($M_W$) of 21,900
- 0.06 parts of tris(2,4-di-tert-butylphenyl)phosphite
- 0.27 parts of pentaerythritol tetrastearate
- 0.27 parts of 2-(2H-benzotriazol-2-yl)-4-(1,1,3,3-tetramethylbutyl)phenol
- 0.00026 parts of a yellow perylene derivative (BASF Lumogen Yellow F-083)
- 0.00014 parts of a red perylene derivative (BASF Lumogen Red F-300)
- 0.00003 parts of an orange perylene derivative (BASF Lumogen Orange F-240)
- 0.001 parts of 2,5-bis(5'-tert-butyl-2-benzoxazolyl)thiophene (Ciba Uvitex OB).

The color coordinates and the edge color are summarized in Table 1. This provides a clear illustration of the ability to create various visual effect colors with a total visible light transmission (Y) greater than about 87% at 3.2 mm thickness.

TABLE 1

| Formulation | Y | x | Y | L* | a* | B* | Visual effect color |
|---|---|---|---|---|---|---|---|
| A | 87.77 | 0.3170 | 0.3253 | 95.06 | −1.04 | 4.58 | Orange |
| B | 88.75 | 0.3150 | 0.3257 | 95.48 | −2.23 | 4.40 | Green |
| C | 87.70 | 0.3087 | 0.3157 | 95.04 | −0.49 | −0.41 | Blue # 1 |
| D | 87.85 | 0.3105 | 0.3202 | 95.10 | −1.82 | 1.60 | Blue # 2 |
| E | 87.59 | 0.3121 | 0.3166 | 94.99 | 0.8 | 0.51 | Red/Pink |
| F | 88.17 | 0.3163 | 0.3166 | 95.24 | 2.97 | 1.25 | Yellow |
| G | 86.99 | 0.3207 | 0.3292 | 94.75 | −1.06 | 6.64 | Orange/Amber |

Example 2

A polycarbonate resin composition (H) was prepared by mixing:
- 70 parts of branched polycarbonate resin with an average molecular weight ($M_W$) of 37,700
- 30 parts of poly(bisphenol-A carbonate) with an average molecular weight ($M_W$) of 21,900
- 0.06 parts of tris(2,4-di-tert-butylphenyl)phosphite
- 0.05 parts of 2,5-bis(5'-tert-butyl-2-benzoxazolyl)thiophene (Ciba Uvitex OB)
- 0.0025 parts of C.I. Solvent Blue 97 (Bayer Macrolex Blue RR).

After compounding (extrusion), resin composition (H) was blow molded to form a water bottle with a blue visual effect.

A polycarbonate resin composition (I) was prepared by mixing:
- 70 parts of branched polycarbonate resin with an average molecular weight ($M_W$) of 37,700
- 30 parts of poly(bisphenol-A carbonate) with an average molecular weight ($M_W$) of 21,900
- 0.06 parts of tris(2,4-di-tert-butylphenyl)phosphite
- 0.05 parts of 2,5-bis(5'-tert-butyl-2-benzoxazolyl)thiophene (Ciba Uvitex OB)
- 0.00015 parts of C.I. Solvent Violet 36 (Bayer Macrolex Violet 3R)
- 0.004 parts of C.I. Solvent Violet 36 (Bayer Macrolex Violet B)
- 0.00035 parts of C.I. Solvent Blue 97 (Bayer Macrolex Blue RR).

After compounding (extrusion), resin composition (I) was blow molded to form a water bottle with a violet visual effect.

A polycarbonate resin composition (J) was prepared by mixing:
- 70 parts of branched polycarbonate resin with an average molecular weight ($M_W$) of 37,700
- 30 parts of poly(bisphenol-A carbonate) with an average molecular weight ($M_W$) of 21,900
- 0.06 parts of tris(2,4-di-tert-butylphenyl)phosphite
- 0.015 parts of C.I. Solvent Yellow 98 (Clariant), a yellow xanthene fluorescent dye 0.00006 parts of C.I. Vat Red 41 (Clariant), a red thioindigoid fluorescent dye.

After compounding (extrusion), resin composition (J) was blow molded to form a water bottle with a yellow visual effect.

The invention claimed is:

1. An article, wherein the article is a bottle comprising an annular portion comprising a molded body formed from a plastic composition comprising a plastic having an index of refraction of at least 1.4 and a fluorescent dye, wherein the annular portion has a graphic image formed as cuts or protrusions, or both, in the plastic composition on a surface of the molded body thereof to provide a luminescent visual effect in the shape of the graphic image as a result of the fluorescent dye that is part of the plastic composition.

2. The article of claim 1, wherein the fluorescent dye is an organic fluorescent dye.

3. The article of claim 2, wherein the fluorescent dye is included at a concentration of 1% or less by weight of the plastic.

4. The article of claim 3, wherein the fluorescent dye provides a blue or violet visual effect and the fluorescent dye is included at a concentration of 0.5 to 0.001% by weight.

5. The article of claim 4, wherein the fluorescent dye is included at a concentration of 0.3 to 0.1% by weight.

6. The article of claim 4, wherein the fluorescent dye is included at a concentration of 0.1% to 0.005% by weight.

7. The article of claim 3, wherein the fluorescent dye provides a red, orange or green visual effect and the fluorescent dye is included at a concentration of less than 0.0005% by weight.

8. The article of claim 7, wherein the fluorescent dye is included at a concentration of 0.0001% to 0.0003% by weight.

9. The article of claim 2, wherein the fluorescent dye is selected from the group consisting of perylene derivatives, anthracene derivatives, indigoid and thioindigoid derivatives, imidazole derivatives, naphtalimide derivatives, xanthenes, thioxanthenes, coumarins, rhodamines, (2,5-bis[5-tert-butyl-2-benzoxazolyl]thiophene) and derivatives thereof.

10. The article of claim 9, wherein the fluorescent dye is included at a concentration of 1% or less by weight of the plastic.

11. The article of claim 2, wherein the fluorescent dye has a quantum yield of 0.7 or greater.

12. The article of claim 2, wherein the graphic images is formed from cuts having a depth of from 0.5 to 3 mm or protrusions having a height of from 0.5 to 5 mm or combinations thereof.

13. The article of claim 1, wherein the article is a bottle having a bottom portion and a sealable top portion.

14. The article of claim 1, wherein the plastic is polycarbonate.

15. The article of claim 14, wherein the fluorescent dye has a quantum yield of 0.9 or greater.

16. The article of claim 14, wherein the fluorescent dye is an organic fluorescent dye.

17. The article of claim 16, wherein the fluorescent dye is included at a concentration of 1% or less by weight of the polycarbonate.

18. The article of claim 17, wherein the fluorescent dye provides a blue or violet visual effect and the fluorescent dye is included at a concentration of 0.5 to 0.001% by weight.

19. The article of claim 18, wherein the fluorescent dye is included at a concentration of 0.3 to 0.1% by weight.

20. The article of claim 18, wherein the fluorescent dye is included at a concentration of 0.1 to 0.005% by weight.

21. The article of claim 17, wherein the fluorescent dye provides a red, orange or green visual effect and the fluorescent dye is included at a concentration of less than 0.0005% by weight.

22. The article of claim 21, wherein the fluorescent dye is included at a concentration of 0.0001% to 0.0003% by weight.

23. The article of claim 16, wherein the fluorescent dye is selected from the group consisting of perylene derivatives, anthracene derivatives, indigoid and thioindigoid derivatives, imidazole derivatives, naphtalimide derivatives, xanthenes, thioxanthenes, coumarins, rhodamines, (2,5-bis[5-tert-butyl-2-benzoxazolyl]thiophene) and derivatives thereof.

24. The article of claim 23, wherein the fluorescent dye is included at a concentration of 1% or less by weight of the polycarbonate.

25. The article of claim 1, wherein article is a bottle and the bottle has an integrally-molded handle.

26. The article of claim 1, wherein the plastic is a polycarbonate.

27. The article of claim 26, wherein the fluorescent dye is selected from the group consisting of perylene derivatives, anthracene derivatives, indigoid and thioindigoid derivatives, imidazole derivatives, naphtalimide derivatives, xanthenes, thioxanthenes, coumarins, rhodamines, (2,5-bis[5-tert-butyl-2-benzoxazolyl]thiophene) and derivatives thereof.

28. The article of claim 27, wherein the fluorescent dye included in the article is included at a concentration of 1% or less by weight of the plastic.

29. The article of claim 27, wherein the fluorescent dye in the article provides a blue or violet visual effect and the fluorescent dye is included at a concentration of 0.5 to 0.001% by weight.

30. The article of claim 29, wherein the fluorescent dye in the article is included at a concentration of 0.3 to 0.1% by weight.

31. The article of claim 29, wherein the fluorescent dye in the article is included at a concentration of 0.1 to 0.005% by weight.

32. The article of claim 27, wherein the fluorescent dye in the article provides a red, orange or green visual effect and the fluorescent dye is included at a concentration of less than 0.0005% by weight.

33. The article of claim 32, wherein the fluorescent dye in the article is included at a concentration of 0.0001% to 0.0003% by weight.

34. The article of claim 1, wherein the graphic image is formed from cuts having a depth of from 0.5 to 3 mm or protrusions having a height of from 0.5 to 5 mm or combinations thereof.

35. The article of claim 1, wherein the fluorescent dye has a quantum yield of 0.7 or greater.

36. The article of claim 35, wherein the fluorescent dye has a quantum yield of 0.9 or greater.

37. The article of claim 1, wherein graphic image includes cuts in the plastic composition extending into the surface of the molded body.

38. The article of claim 2, wherein the graphic images includes cuts in the plastic composition having a depth of from 0.5 to 3 mm.

39. The article of claim 1, wherein the graphic images includes cuts in the plastic composition having a depth of from 0.5 to 3 mm.

* * * * *